H. D. WILLIAMS & R. JANNEY.
POWER TRANSMITTING MECHANISM.
APPLICATION FILED SEPT. 22, 1911.
1,203,165.
Patented Oct. 31, 1916.
4 SHEETS—SHEET 3.
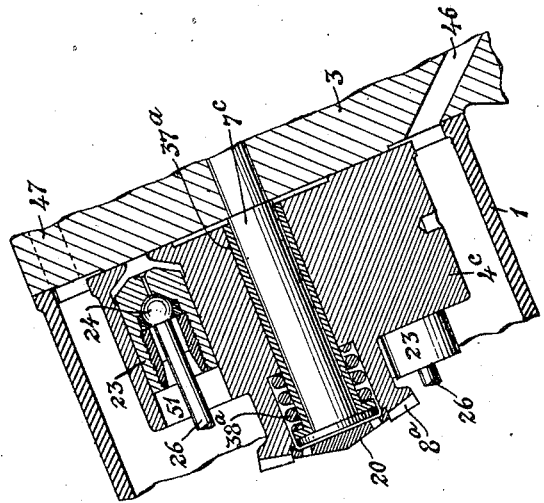
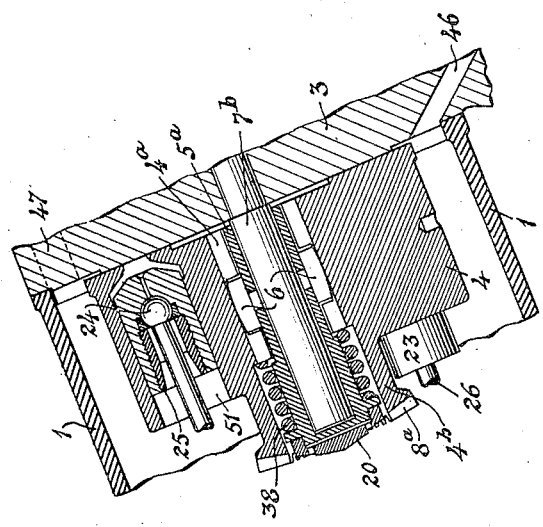
WITNESSES
INVENTOR
REYNOLD JANNEY
HARVEY D. WILLIAMS
BY
ATTORNEYS H. D. WILLIAMS & R. JANNEY.
POWER TRANSMITTING MECHANISM.
APPLICATION FILED SEPT. 22, 1911.
1,203,165.
Patented Oct. 31, 1916.
4 SHEETS—SHEET 4.
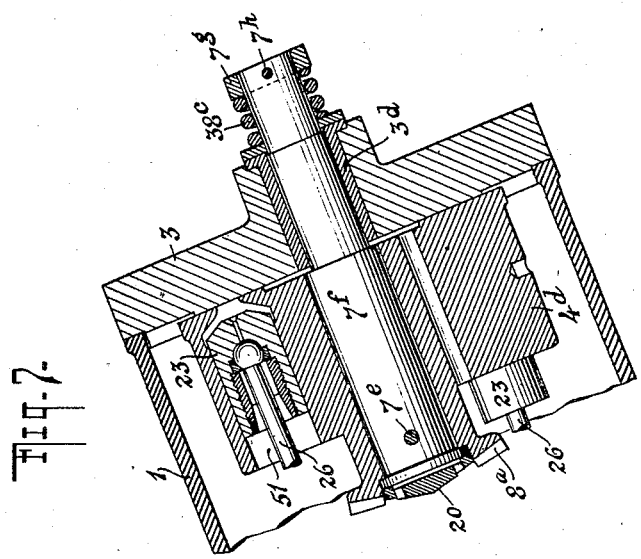
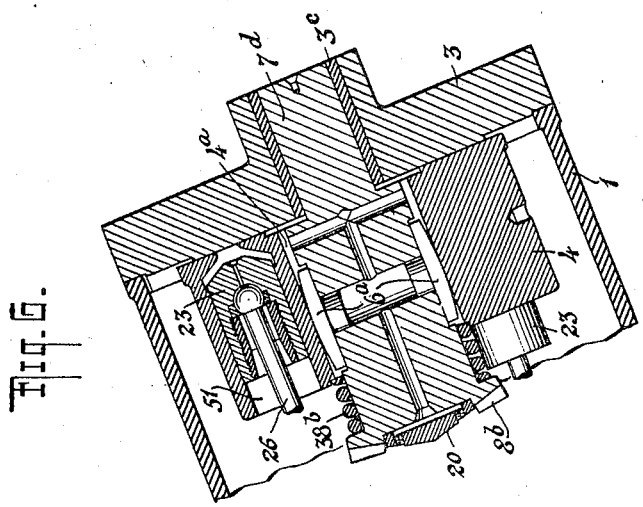
WITNESSES
INVENTORS
REYNOLD JANNEY
HARVEY D. WILLIAMS
BY
ATTORNEYS

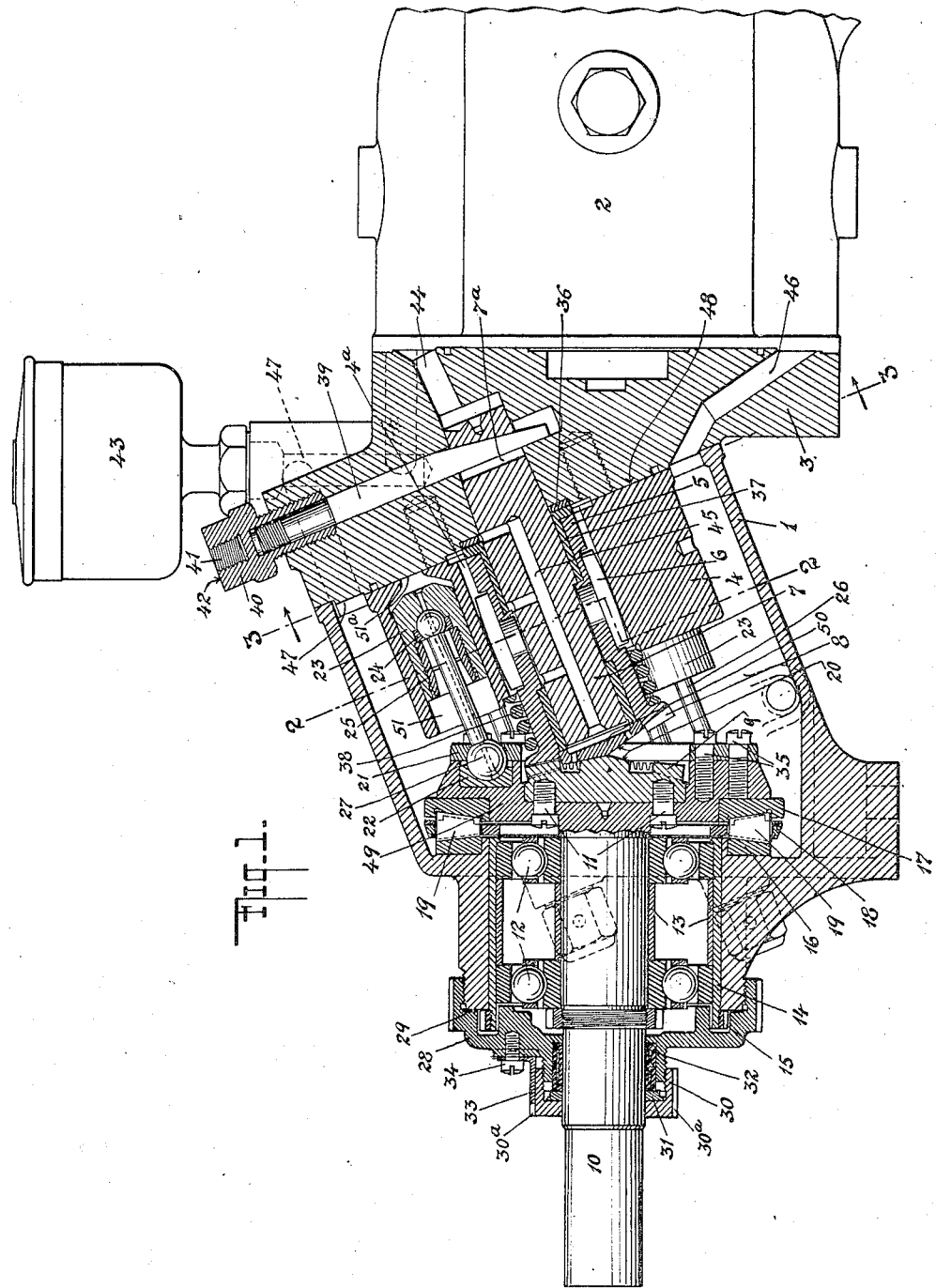

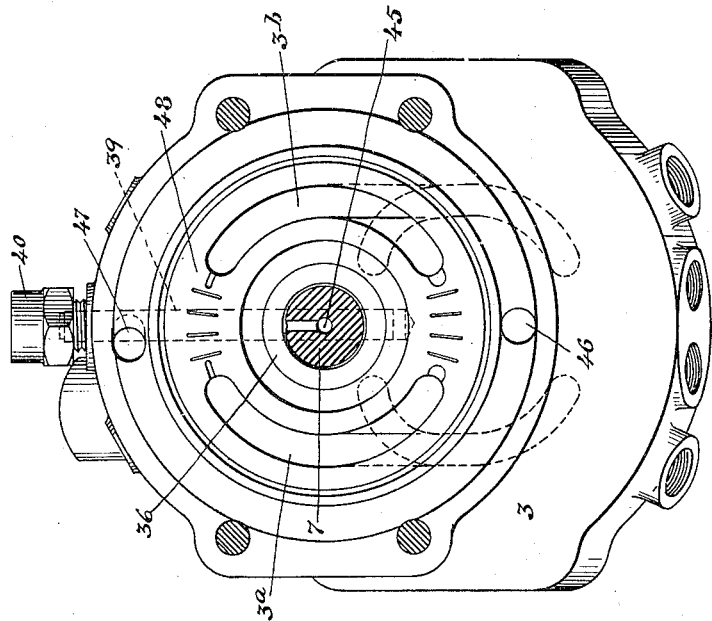
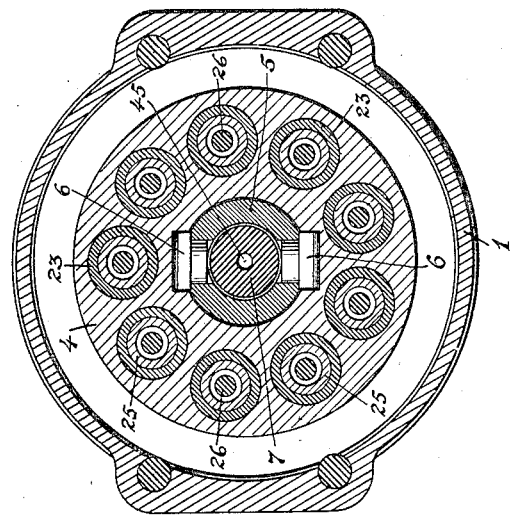

UNITED STATES PATENT OFFICE.

HARVEY D. WILLIAMS AND REYNOLD JANNEY, OF NEW YORK, N. Y., ASSIGNORS TO THE WATERBURY TOOL COMPANY, OF WATERBURY, CONNECTICUT, A CORPORATION OF CONNECTICUT.

POWER-TRANSMITTING MECHANISM.

1,203,165. Specification of Letters Patent. Patented Oct. 31, 1916.

Application filed September 22, 1911. Serial No. 650,772.

*To all whom it may concern:*

Be it known that we, HARVEY D. WILLIAMS and REYNOLD JANNEY, both citizens of the United States, and both residents of the borough of Manhattan, city, county, and State of New York, have invented certain new and useful Improvements in Power-Transmitting Mechanism, of which the following is a specification.

Our present invention relates to mechanism for transmitting power between two rotary parts whose axes are arranged at an angle to each other and intersect.

The invention has been devised more particularly for use in a pump or motor of the character shown in Letters Patent 925,148 issued to one of us, (Harvey D. Williams) on June 15, 1909. In said patent, a universal joint connection is employed between the two parts rotating about intersecting axes, (the relative speeds of said two parts therefore varying in accordance with the laws governing universal joint connections). The effects of this uneven action we have endeavored to correct by various expedients disclosed in the aforesaid Letters Patent and in others.

Our present invention has for its object to avoid all necessity for correction by insuring absolute conformity in the rotary speed of the two members rotating about intersecting axes.

In the accompanying drawings we have illustrated several typical forms of our invention, as applied to a fluid-pressure motor, but the device shown is reversible in function, that is to say, it is capable of operating as a pump.

Figure 1 is a longitudinal section of the mechanism, Figs. 2 and 3 are cross-sections on lines 2—2 and 3—3 respectively of Fig. 1. Figs. 4, 5, 6 and 7 are partial cross-sections showing other embodiments of our invention.

The inclined cylindrical casing 1 of the motor is fitted tightly against the stationary valve plate or valve block 3, provided with segmental ports $3^a$ and $3^b$ respectively, one of these serving to admit a fluid (say oil) under pressure, while the other serves as an outlet through which the oil passes from the motor after having actuated it.

The manner of supplying the oil under pressure and of disposing of the oil discharge from the motor, is immaterial to our present invention, but in practice we intend to use this motor in connection with a variable delivery pump of the character set forth in the aforesaid Letters Patent, so that the pump and motor together will constitute a variable speed gear. At 2 we have indicated a portion of the casing of such a variable delivery pump. The valve plate 3 has an inner face 48, perpendicular to the axis of the casing 1, and against this annular face is adapted to revolve the barrel 4, provided with a number of cylinders 51, (nine cylinders in the example shown), having reduced ports $51^a$ which at times are closed by the face 48 of the valve plate 3, and at other times register with either the port $3^a$ or the port $3^b$. The cylinders are all alike in the construction shown, extend parallel with the inclined axis about which the barrel 4 rotates, and are equidistant from said axis.

In the center of the valve plate 3 there is a stud 7, tapered to fit a correspondingly shaped hole in the valve plate. The tapered end of this stud is provided with a transverse slot $7^a$ one end of which is angular. In this slot a pin 39 is inserted so as to securely hold the stud in the valve plate. The pin 39 is held securely in position by a cap screw 40, which being screwed into the valve plate presses down against the end of the pin 39.

For convenience in withdrawing the pin, its upper end is threaded. This thread is not in use, however, except when it is desired to withdraw the pin. The outer end of the cap screw 40 is threaded as shown at 41. When the cap screw is unscrewed from its position in the valve plate, it is reversed, and the threaded part 41 is screwed on to the threaded end of the pin 39. When the face 42 of the cap 40 strikes against the valve plate, the pin 39 is pulled out and may then be withdrawn from the stud 7.

On the stud 7, rotates a sleeve 5 fitted within the barrel 4. In the two ends of this sleeve are bearing bushings 37 which rotate with the sleeve around the stud. One of these bushings engages a thrust washer 36 set into the valve plate and made of hardened steel. One end of the sleeve 5 is provided with bevel gear teeth 8, the function of which will be explained later. Near the center of the sleeve are two T-shaped keys 6.

The stems of these keys are round and fit into holes in the sleeve, while the tops of the keys are flat and rest on flattened surfaces on the sleeve. The flattened parts of the keys also slide in key slots 4$^a$ in the cylinder barrel 4.

The T keys 6 made as above described can oscillate about their stems and since the tops of these keys are beveled toward the ends and the barrel 4 does not fit tightly around the sleeve 5, only enough to center it properly, the barrel as a whole is free to oscillate a little and so adjust itself to rest flat against the face 48, of the valve plate 3. A spiral spring 38 rests between the end of the cylinder barrel and a shoulder on the sleeve next to the gear teeth 8. This spring keeps the cylinder barrel pressed against the face of the valve plate.

At the left of the spring in Fig. 1 extends the driven shaft 10. The inner end of this shaft is enlarged into a disk-like piece 49. Around this disk are placed the sockets 22, there being as many sockets as there are pistons 23, movable in the cylinders 51 of the cylinder barrel 4, and they are equally spaced. In each of the sockets 22 rests the ball end 27 of a connecting rod 26, there being one rod from each piston. The ball ends are held in the socket by a socket face cap 21, which is held by screws 35 to the face of the socket ring or disk 49. Similarly the other ends of the rods 26 are held in the pistons 23 by means of bushings 24, usually split for convenience of assembling and threaded sleeves 25.

To the inner end of the shaft 10, and within the circle of the socket, is secured rigidly a bevel gear 9, as by the screws 11. This bevel gear meshes with the gear teeth 8 on the barrel sleeve 5. In order that the teeth may not be forced together by an end thrust on the shaft, or by the end thrust due to the action of the spring 38, a central extension of the gear 9 is fitted with the conical surface 20, this surface coinciding with the pitch surface of the bevel gear. A corresponding conical surface is provided on the disk 50, which is inserted into the end of the barrel sleeve 5.

It will be seen that since the shaft 10 and the barrel sleeve 5 are connected by the bevel gears 8 and 9 the rotation of the shaft 10 and the barrel sleeve 5 will be in exact unison. This provides perfect regularity between the positions of the cylinders in the cylinder barrel and the sockets in the socket disk, so that the reciprocation of the pistons will be entirely free from the universal joint irregularities occurring with our former constructions.

For the sake of completeness, we shall now describe certain other features appearing in the drawings: The shaft 10 is supported in antifriction bearings, ball bearings 12 being shown in Fig. 1, with a separate sleeve 13 between them. In order to facilitate removal of these bearings when desired, they are contained within a sleeve 14, tapered on the outside to fit a corresponding seat in the casing 1. The outer end of the sleeve is threaded to receive a nut 15 which abuts against the end of the casing. Thus by turning the nut in the proper direction the sleeve 14 will be moved outward to start it from its tapered seat. To take up end thrust, a race 16 is secured on the inside of the casing 1, adjacent to the inner end of the shaft 10, and an opposing channel track 17 is secured rigidly to the socket disk 49. This race and track are engaged by thrust rolls 19 spaced by means of a separator or cage 18. To secure a tight joint at the outer end of the shaft 10, a stuffing box 28 is screwed on the end of the casing 1, to press a soft metal gasket 29 against said casing. The threaded outer end of the stuffing box 28 receives a cap 30 for pressing the gland 31 against the shaft packing 32. The cap 30 after adjustment, is held against turning by means of a key 33, engaging one of a number of grooves 30$^a$ and secured by means of a screw 34, extending into the stuffing box 28. Finally, to allow the oil which usually fills the casing 1, to expand without straining the machine, the following arrangements are provided. An oil expansion box 43 communicates with a passage 47 in the upper portion of the valve plate 3, which passage is open permanently to the upper portion of the chamber inclosed by the casing 1, and also in the case illustrated, to the corresponding portion of the chamber inclosed within the casing 2. The barrel stud 7 is provided with lubricating channels 45 and similar channels are provided in the pistons 23 and connecting rods 26. At the lower portion of the valve plate 3, a channel 46 connects the lower portion of the chamber inclosed by the casing 1, with the lower portion of the corresponding chamber within the casing 2, in substantially the same manner that the passage 47 connects the upper portions of said chambers.

It will be readily understood that the construction described above may be altered in various respects without in the least affecting the principle of operation set forth. A few of the possible modifications are illustrated in Figs. 4 to 7 inclusive. The bevel teeth 8$^a$ (intended to mesh with the teeth 9 shown in Fig. 1), are provided on an extension 4$^b$ of the barrel 4, instead of being formed on the sleeve 5$^a$. This sleeve differs but slightly in shape from the sleeve 5 of Fig. 1, but has the same function in connection with the barrel 4, springs 38 and stud 7$^b$, the latter being suitably secured to the valve plate 3. It will be understood that Figs. 4 to 7 are incomplete, the parts not shown therein being of the same construction as in Fig. 1. The barrel 4ᶜ of Fig. 5 is fitted to slide freely on a bearing bushing 37ᵃ mounted loosely on the stud 7ᶜ which is provided with a head at its free end. The spring 38ᵃ bears against the bushing 37ᵃ and against the barrel. The conical surface 20 is formed on a plate attached to the barrel 4ᶜ. In other respects, the construction is the same as described above.

In Fig. 6 the stud 7ᵈ is journaled in any suitable bearing, such as a plain long bearing 3ᵉ, in the valve plate 3. This revolving stud carries the bevel teeth 8ᵇ and the conical surface 20, also the keys 6ᵃ corresponding to the keys 6 of Fig. 1. The spring 38ᵇ is interposed between shoulders on the barrel 4, and on the rotating stud 7ᵈ respectively.

In Fig. 7, the barrel 4ᵈ is made integral with or rigidly attached (by a pin 7ᵉ) to the rotary stud 7ᶠ, journaled in a bearing 3ᵈ of the valve plate 3. One end of the stud carries the conical surface 20 adjacent to the bevel teeth 8ᵃ on the barrel, the other end of the stud has a collar 7ᵍ secured to it by a pin 7ʰ a spring 38ᶜ being interposed between said collar and the bearing 3ᵈ to press the barrel 4ᵈ against the valve plate 3.

While in Figs. 4, 5 and 7 we have shown gear teeth 8ᵃ directly on the barrel 4, 4ᶜ or 4ᵈ respectively, we prefer constructions of the character illustrated by Figs. 1, 2, 3 and 6, where the barrel 4 is movable lengthwise (under the influence of the spring 38 or 38ᵇ respectively, and of the excess liquid pressure on the inner faces of the reduced ends at the cylinder ports) relatively to the member (7 or 7ᵈ respectively), which is provided with the gear teeth (8 or 8ᵇ respectively). The longitudinal mobility of the cylinder barrel relatively to the toothed member with which said barrel rotates, is of advantage for the following reasons: The driving force applied to the gear teeth unsymmetrically, that is to say, only at one side of the axis, produces an uneven or one-sided longitudinal stress. When the gear teeth are on the barrel, as in Figs. 4, 5 and 7, this one-sided stress comes directly on the barrel and tends to impair the tightness of the joint between the barrel and the valve plate. By separating the barrel from the member carrying the gear teeth, we are enabled to exert on the barrel (as by means of the spring 38 or 38ᵇ) a steady or uniform axial thrust to hold the barrel tightly against the valve plate, said thrust being entirely independent of the changeable and uneven forces arising at the gears, and of dimensional changes which accompany stresses and changes of temperature and of imperfection due to wear or to lack of perpendicularity in machining. In the preferred form of our invention, we thus exert a constant axial or longitudinal thrust on the barrel, and apply the torque to a separate toothed member which while compelled to rotate with the barrel, leaves the latter free to move lengthwise relatively to the toothed member and to adjust itself properly to the face of the valve plate; the barrel is therefore relieved of any unsymmetrical driving stress, and of the effect of wear or of imperfect alinement.

Various modifications may be made without departing from the nature of our invention as set forth in the appended claims.

We claim as our invention:

1. The combination of a stationary valve plate having ports, a barrel held to rotate adjacent to said valve plate and provided with cylinders having ports adapted to register with those of the valve plate, pistons in said cylinders, a shaft disposed at an angle to the axis of the barrel, a member rotatable in unison with the barrel and projecting therefrom toward said shaft, the adjacent ends of said shaft and member being geared together and also having conical engaging surfaces to take up end thrust, and a connection between the shaft and the pistons to cause the reciprocation of the pistons in the cylinders to be simultaneous with the rotation of the shaft and the barrel.

2. The combination of a stationary valve plate having ports, a barrel held to rotate adjacent to said valve plate and provided with cylinders having ports adapted to register with those of the valve plate, pistons in said cylinders, a shaft disposed at an angle to the axis of the barrel, a member co-axial with the barrel and geared to said shaft to rotate in unison therewith, a key carried by said member and engaging the barrel to compel it to rotate in unison with said member yet allowing the barrel to slide lengthwise of said member, said key being beveled lengthwise to allow the barrel to rock thereon, and a connection between the shaft and the pistons to cause the reciprocation of the pistons in the cylinders, to be simultaneous with the rotation of the shaft and of the barrel.

3. The combination of a stationary valve plate having ports, a barrel held to rotate adjacent to said valve plate and provided with cylinders having ports adapted to register with those of the valve plate, pistons in said cylinders, a shaft disposed at an angle to the axis of the barrel, a member co-axial with the barrel and geared to said shaft to rotate in unison therewith, a key swiveled to said member to swing on an axis transverse to the axis of rotation, and engaging the barrel to compel it to rotate in unison with said member yet allowing the barrel to slide lengthwise of said member and a connection between the shaft and the pistons to cause the reciprocation of the pistons to be simultaneous with the rotation of the shaft and barrel.

4. The combination of a stationary valve plate having ports, a barrel held to rotate adjacent to said valve plate and provided with cylinders having ports adapted to register with those of the valve plate, pistons in said cylinders, a shaft disposed at an angle to the axis of the barrel, a member co-axial with the barrel and geared to said shaft to rotate in unison therewith, a key swiveled to said member to swing on an axis transverse to the axis of rotation, and engaging the barrel to compel it to rotate in unison with said member yet allowing the barrel to slide lengthwise of said member, said key being beveled lengthwise to allow the barrel to rock thereon, and a connection between the shaft and the pistons to cause the reciprocation of the pistons to be simultaneous with the rotation of the shaft and barrel.

5. The combination of a stationary valve plate having ports, a barrel held to rotate adjacent to said valve plate and provided with cylinders having ports adapted to register with those of the valve plate, pistons in said cylinders, a shaft disposed at an angle to the axis of the barrel, a ring perpendicular to said shaft and held to rotate therewith, rods connecting said ring with the pistons, bevel gearing for compelling the barrel to rotate in unison with the shaft, and conical thrust-receiving surfaces adjacent to the members of the bevel gearing.

6. The combination of a stationary valve plate having ports, a barrel held to rotate adjacent to said valve plate and provided with cylinders having ports adapted to register with those of the valve plate, pistons in said cylinders, a shaft disposed at an angle to the axis of the barrel, meshing bevel gears, one held to rotate in unison with said shaft, and the other in unison with the barrel, engaging conical surfaces, coincident with the pitch surfaces of the bevel gears, to take up the end thrust of said gears, and a connection between the shaft and the pistons to cause the reciprocation of the pistons in the cylinders to be simultaneous with the rotation of the shaft and barrel.

7. The combination of a stationary valve plate having ports, a barrel held to rotate adjacent to said valve plate and provided with cylinders having ports adapted to register with those of the valve plate, pistons in said cylinders, a stationary stud co-axial with said barrel, a sleeve mounted to turn on said stud and held against longitudinal movement but compelled to rotate with the barrel yet allowing the latter to slide lengthwise of the sleeve, a shaft disposed at an angle to the axis of said barrel, meshing gear teeth on said shaft and sleeve respectively, and a connection between the shaft and the pistons to cause the reciprocation of the pistons in the cylinders to be simultaneous with the rotation of the shaft and barrel.

8. The combination of a stationary valve plate having ports, a barrel held to rotate adjacent to said valve plate and provided with cylinders having ports adapted to register with those of the valve plate, pistons in said cylinders, a stationary stud co-axial with said barrel, a sleeve mounted to turn on said stud and held against longitudinal movement but compelled to rotate with the barrel yet allowing the latter to slide lengthwise of the sleeve, said sleeve extending beyond the barrel at the end farthest from the valve plate, a spring interposed between said end of the barrel and the projecting portion of the sleeve to press the barrel toward the valve plate, a shaft disposed at an angle to the axis of said barrel, meshing gear teeth on said shaft and sleeve respectively, and a connection between the shaft and the pistons to cause the reciprocation of the pistons in the cylinders to be simultaneous with the rotation of the shaft and barrel.

In testimony whereof we have hereunto set our hands in the presence of two subscribing witnesses.

HARVEY D. WILLIAMS.
REYNOLD JANNEY.

Witnesses as to Harvey D. Williams:
JOHN A. KEHLENBECK,
LOUIS ALEXANDER.

Witnesses as to Reynold Janney:
HORACE G. HOADLEY,
M. G. STEARNS.